US010567080B2

(12) United States Patent
Chamberlain et al.

(10) Patent No.: US 10,567,080 B2
(45) Date of Patent: Feb. 18, 2020

(54) CONCENTRIC FIBER FOR SPACE-DIVISION MULTIPLEXED OPTICAL COMMUNICATIONS AND METHOD OF USE

(71) Applicant: CommScope Technologies LLC, Hickory, NC (US)

(72) Inventors: John Charles Chamberlain, Hickory, NC (US); Sander Johannes Floris, Lennisheuvel (NL)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/996,018

(22) Filed: Jun. 1, 2018

(65) Prior Publication Data

US 2019/0007138 A1    Jan. 3, 2019

Related U.S. Application Data

(60) Provisional application No. 62/514,581, filed on Jun. 2, 2017.

(51) Int. Cl.
| | |
|---|---|
| *H04B 10/25* | (2013.01) |
| *H04J 14/02* | (2006.01) |
| *G02B 6/036* | (2006.01) |
| *G02B 6/36* | (2006.01) |
| *H04B 10/85* | (2013.01) |

(52) U.S. Cl.
CPC ......... *H04B 10/25* (2013.01); *G02B 6/03644* (2013.01); *G02B 6/03688* (2013.01); *H04J 14/02* (2013.01); *G02B 6/36* (2013.01); *H04B 10/85* (2013.01)

(58) Field of Classification Search
CPC ............... H04B 10/25; H04B 10/2581; G02B 6/02042; G02B 6/03644; G02B 6/03688; G02B 6/036; G02B 6/28; G02B 6/44; H04J 14/02; H04J 14/04; H04Q 11/00
USPC .......................................................... 398/98
See application file for complete search history.

(56) References Cited

U.S. PATENT DOCUMENTS

| | | | |
|---|---|---|---|
| 4,363,533 A | * 12/1982 | Stowe | .................... G02F 1/0134 367/141 |
| 4,852,968 A | * 8/1989 | Reed | .................. G02B 6/02238 385/127 |
| 5,627,934 A | 5/1997 | Muhs | |
| 6,062,046 A | 5/2000 | Terasawa et al. | |

(Continued)

OTHER PUBLICATIONS

Birks et al., "The Photonic Lantern," Advances in Optics and Photonics, vol. 7, pp. 107-167 (2015).

(Continued)

*Primary Examiner* — Abbas H Alagheband
(74) *Attorney, Agent, or Firm* — Merchant & Gould P.C.

(57) ABSTRACT

A space-division multiplexed optical fiber includes a relatively high refractive index optical core region surrounded by alternating regions of relatively low and relative high refractive index material, forming concentric high index rings around the core. The optical core region supports propagation of light along at least a first radial mode associated with the optical core region and a high index ring region supports propagation of light along at least a second radial mode associated with the high index ring region. The second radial mode is different from the first radial mode.

12 Claims, 12 Drawing Sheets

(56) References Cited

U.S. PATENT DOCUMENTS

| | | | |
|---|---|---|---|
| 6,091,873 A * | 7/2000 | Matsuo | G02B 6/02009 385/123 |
| 6,295,843 B1 | 10/2001 | Terasawa et al. | |
| 6,515,305 B2 * | 2/2003 | Gopinath | H01S 5/18327 257/79 |
| 6,519,402 B2 | 2/2003 | Aikawa et al. | |
| 6,526,209 B1 * | 2/2003 | Hasegawa | B82Y 20/00 385/126 |
| 6,535,677 B1 * | 3/2003 | Tanaka | C03B 37/0253 385/123 |
| 6,614,815 B1 * | 9/2003 | Kane | H01S 3/067 359/328 |
| 6,892,018 B2 * | 5/2005 | Libori | C03B 37/0122 385/127 |
| 6,975,801 B2 | 12/2005 | Bickham | |
| 7,760,771 B2 * | 7/2010 | Salokatve | G02B 6/03611 372/6 |
| 7,773,847 B2 | 8/2010 | Negishi et al. | |
| 7,805,038 B2 * | 9/2010 | Williams | B82Y 20/00 385/123 |
| 8,107,783 B2 * | 1/2012 | Gruner-Nielsen | G02B 6/03666 385/123 |
| 8,139,912 B2 * | 3/2012 | Gapontsev | G02B 6/02023 385/123 |
| 8,204,349 B2 * | 6/2012 | Gapontsev | G02B 6/02023 385/123 |
| 8,285,101 B2 * | 10/2012 | Gapontsev | G02B 6/02023 385/123 |
| 8,406,594 B2 * | 3/2013 | Alkeskjold | B29D 11/00663 385/125 |
| 8,428,413 B2 * | 4/2013 | Gruner-Nielsen | G02B 6/03666 385/127 |
| 8,934,749 B2 * | 1/2015 | Hotoleanu | G02B 6/02023 385/124 |
| 8,948,559 B2 | 2/2015 | Gruner-Nielsen et al. | |
| 9,146,346 B2 * | 9/2015 | Pare | G02B 6/024 |
| 9,529,147 B2 | 12/2016 | Murshid et al. | |
| 2002/0090187 A1 * | 7/2002 | Tirloni | G02B 6/02009 385/127 |
| 2003/0128948 A1 * | 7/2003 | Tirloni | G02B 6/02009 385/127 |
| 2006/0269200 A1 * | 11/2006 | DiGiovanni | G02B 6/02019 385/123 |
| 2007/0077004 A1 * | 4/2007 | DiGiovanni | G02B 6/02019 385/28 |
| 2007/0274651 A1 * | 11/2007 | DiGiovanni | G02B 6/02019 385/124 |
| 2008/0025363 A1 * | 1/2008 | Yla-jarkko | G02B 6/03611 372/98 |
| 2008/0114254 A1 * | 5/2008 | Matcovitch | A61B 5/0097 600/463 |
| 2009/0060437 A1 | 3/2009 | Fini et al. | |
| 2012/0251126 A1 * | 10/2012 | Winzer | G02B 6/03611 398/141 |
| 2016/0231503 A1 | 8/2016 | Sillard et al. | |
| 2016/0233959 A1 * | 8/2016 | Murshid | H04B 10/2581 |
| 2017/0023757 A1 | 1/2017 | Kachmar | |
| 2017/0155466 A1 | 6/2017 | Zhou et al. | |
| 2017/0244478 A1 * | 8/2017 | Weiner | H04L 29/00 |

OTHER PUBLICATIONS

Huang et al., "Mode division multiplexing using an orbital angular momentum mode sorter and MIMO-DSP over a graded-index few-mode optical fibre," Scientific Reports, vol. 5, 7 pages (Oct. 9, 2015).

Van Weerdenburg et al., "Exploiting Selective Excitation of Strongly Coupled Modes to Reduce DMGD in Multi-mode Transmission Systems," 42nd European Conference and Exhibition on Optical Communications, pp. 692-694 (Sep. 18-22, 2016).

International Search Report and Written Opinion for Application No. PCT/US2018/035583 dated Sep. 20, 2018.

* cited by examiner

CONCENTRIC FIBER FOR SPACE-DIVISION MULTIPLEXED OPTICAL COMMUNICATIONS AND METHOD OF USE

CROSS REFERENCE TO RELATED APPLICATION

This application claims the benefit of provisional application Ser. No. 62/514,581, filed Jun. 2, 2017, which is incorporated herein by reference in its entirety.

BACKGROUND OF THE INVENTION

The present invention is generally directed to optical communications, and more specifically to improved methods of increasing the information transmission capacity for a single fiber.

Historically, several steps have been taken to improve the information transmission bandwidth in single mode fiber (SMF) optical communications systems, which are typically used for transmitting information over distances of a kilometer or more. Low transmission loss silica fibers were developed in the late 1970s and early 1980s, permitting the use of silica fibers over greater distances. The advent of erbium-doped fiber amplifiers (EDFAs), providing amplification for signals around 1550 nm, permitted the transmission of signals over even greater distances, while the introduction of wavelength division multiplexing/demultiplexing (WDM) extended the bandwidth of silica fibers by permitting a single mode silica fiber to carry different optical signals at different wavelengths. Optical communication systems have further benefitted from the introduction of advanced techniques such as polarization multiplexing and higher order modulation schemes to increase spectral efficiency (bits/s/Hz). However, current SMF optical transmission systems are now approaching their intrinsic capacity limits, and it is expected that they will be unable to meet future capacity requirements.

One approach being considered for increasing fiber capacity is space division multiplexing (SDM), in which different optical signals are physically (spatially) separated from each other within the same fiber. One particular implementation of SDM is to use a multi-core fiber (MCF), in which a number of different single-mode cores are contained within the same cladding material, laterally separated from each other within the cladding. An important issue for MCF is that crosstalk between cores or modes increases with transmission distance, and/or arises due to bends and fiber imperfections. Extensive digital signal processing is, therefore, needed to perform channel characterization and cope with the crosstalk in a fashion similar to multiple-input multiple-output (MIMO) transmission in radio systems. Furthermore, it is difficult and expensive to manufacture optical fibers having multiple cores within a single cladding. Furthermore, connectivity of the MCF is complicated because the multiple cores require precise rotational alignment of the fiber end about the fiber axis in order for the cores to be aligned.

Another proposed implementation of SDM relies on a fiber having a single core with a diameter that is larger than required for single-mode operation and which supports the propagation of a small number of modes. This fiber is referred to as a few-mode fiber (FMF). In a perfectly straight and circularly symmetric fiber, the modal electromagnetic fields do not interact in the sense that the power carried by each mode remains unchanged as the total electromagnetic field propagates in the fiber, thus theoretically each mode can act as an independent transmission channel. However, due to fiber imperfections and/or bends, a mode couples power to other modes, predominantly to those that have similar propagation coefficients. Over long distances, the optical power is likely to be distributed over multiple modes. This can be problematic, however, because a mode couples to a specific linear combination of all FMF modes, and the excitation of another mode couples to a linear combination of all FMF modes that is still orthogonal. With the aid of digital signal processing, the original signals can thus still be recovered. The refractive index profile of a typical FMF has a parabolic shape in the core region, to mitigate differential mode delay, i.e., to assure that the arrival times of all the modes are very similar. This relaxes the requirements on the size of the digital signal processor (DSP) required for signal analysis at the receiver.

Another proposed implementation of SDM relies on optical angular momentum (OAM) multiplexing in a fiber. Difficulties with this approach include the implementation of mode (de)multiplexers having high mode selectivity and avoiding the 1/N insertion loss associated with cascaded beam splitters.

Accordingly, there is a need for improved methods of implementing SDM that can reduce the effects of the problems discussed above.

SUMMARY OF THE INVENTION

One embodiment of the invention is directed to an optical fiber that has a relatively high refractive index optical core region formed of material having a first refractive index, a first low index region surrounding the optical core region and formed from a material having a second refractive index lower than the first refractive index, a first high index ring region surrounding the first low index region and formed of a material having a third refractive index higher than the second refractive index, and a second low index region surrounding the first high index region and formed from a material having a fourth refractive index lower than the third refractive index. The optical core region supports propagation of light along at least a first radial mode associated with the optical core region and the first high index ring region supports propagation of light along at least a second radial mode associated with the first high index ring region, the second radial mode being different from the first radial mode.

In some embodiments the first and third refractive indices are the same, while in others the first refractive index is greater than the third refractive index. In some embodiments the second and fourth refractive indices are the same.

Another embodiment of the invention is directed to a method of communicating that includes generating a first optical signal and generating a second optical signal. The method also includes providing a concentric spatial division multiplexed (SDM) fiber having a core formed of a first material having a first relatively high refractive index material and a first high index ring formed around the core of a second material having a second relatively high refractive index, the core and the first high index ring being separated by a ring of third material having a third refractive index lower than the first relatively high refractive index and lower than the second relatively high refractive index. The first optical signal is transmitted into a first mode of the concentric SDM fiber propagating substantially along the core. The second optical signal is transmitted into a second mode of the concentric SDM fiber propagating substantially along the first high index ring. The first optical signal is detected, after propagating along the concentric SDM fiber, substantially free of the second optical signal. The second optical signal is detected, after propagating along the concentric SDM fiber, substantially free of the first optical signal.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is directed to an approach to space division multiplexing (SDM) that makes use of concentric ring cores. Where the rings are separated relatively far away from each other and/or the refractive index difference between a ring and the cladding is sufficiently large, the modal electromagnetic fields are relatively strongly bound to the individual rings. The modal fields bound to a particular ring may constitute an independent transmission channel. The multitude of modal fields that may exist for a particular ring can facilitate space division multiplexing to be employed on a ring level. Since the concentric ring cores can be implemented in a circularly symmetric geometry, connectivity of such a fiber is simpler than with a multiple core fiber (MCF), which requires rotational alignment about the fiber axis to ensure that the cores are aligned with their respective mates.

In other cases, where the rings are located closer together, and/or the refractive index difference between the ring and the cladding is lower, the modal electromagnetic fields may span more than one ring. Such a design may be used in a fashion similar to that of a few-mode fiber (FMF). The propagation coefficients of the modes of the concentric ring fiber may have better isolation than in an FMF, making the modal power distribution less sensitive to micro and/or macro bending. Under some circumstances, the modal group velocities for this design may have larger variations than in an FMF, but this is unlikely to pose problems for shorter optical communication channels.

Figure 1:
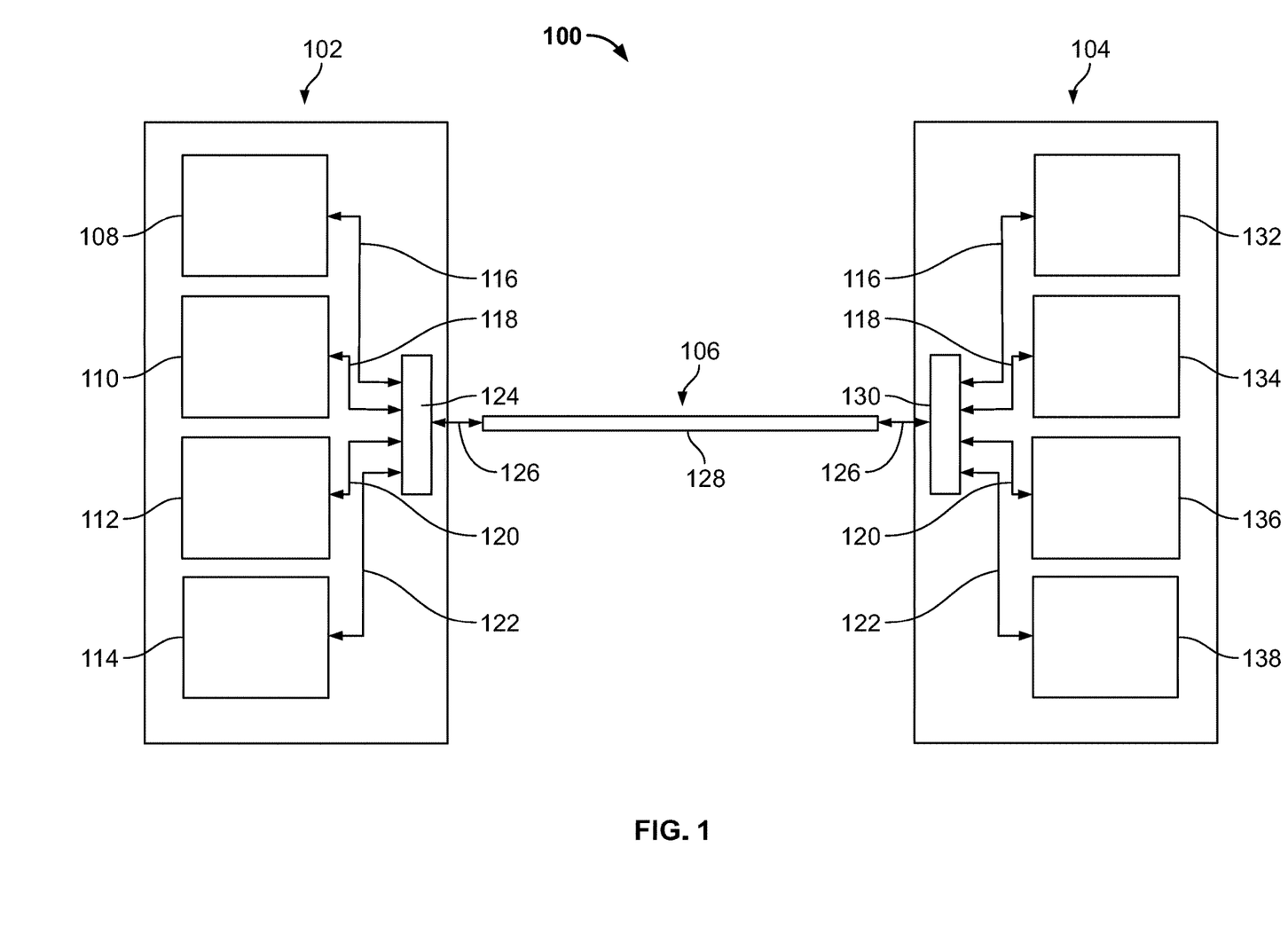
FIG. 1 schematically illustrates an embodiment of an optical communications system that uses space division multiplexing to propagate optical communications signals along a single optical fiber in different concentric fiber modes.

An exemplary embodiment of an optical communication system 100 is schematically illustrated in FIG. 1. The optical communication system 100 generally has a transmitter portion 102, a receiver portion 104, and a fiber optic portion 106. The fiber optic portion 106 is coupled between the transmitter portion 102 and the receiver portion 104 for transmitting an optical signal from the transmitter portion 102 to the receiver portion 104.

In this embodiment, the optical communication system 100 is of a space division multiplexing (SDM) design. Optical signals are generated within the transmitter portion 102 and are combined into different modes of a concentric SDM optical fiber 128 in the optical fiber portion 106 to the receiver portion 104 where the signals that propagated along different fiber modes are spatially separated and directed to respective detectors. The illustrated embodiment shows an optical communication system 100 that spatially multiplexes four different signals, although it will be appreciated that optical communications systems may spatially multiplex different number of signals, e.g. two, three or more than four.

Transmitter portion 102 has multiple transmitter units 108, 110, 112, 114 producing respective optical signals 116, 118, 120, 122. The optical communication system 100 may operate at any useful wavelength, for example in the range 800-950 nm, or over other wavelength ranges, such as 1250 nm-1350 nm, 1500 nm-1600 nm, or 1600 nm-1650 nm. Each transmitter unit 108, 110, 112, 114 is coupled to the optical fiber system 106 via a space division multiplexer 124, which directs the optical signals 116, 118, 120, 122 into respective modes of a concentric SDM optical fiber 128 of the optical fiber system 106.

The multi-mode optical signal 126 propagates along the optical fiber system 106 to the receiver portion 104, where it is split by the space division demultiplexer 130 into the optical signals 116, 118, 120, 122 corresponding to the different modes of the concentric SDM optical fiber 128 that were excited by light from the space division multiplexer 124. Thus, according to this embodiment, the transmitter unit 108 produces an optical signal 116, which is transmitted via a first mode of the concentric SDM optical fiber 128 to the receiver unit 132, the transmitter unit 110 produces an optical signal 118 which is transmitted via a second mode of the concentric SDM optical fiber 128 to the receiver unit 134, the transmitter unit 112 produces an optical signal 120, which is transmitted via a third mode of the concentric SDM optical fiber 128 to the receiver unit 136, and the transmitter unit 114 produces an optical signal 122 which is transmitted via a fourth mode of the concentric SDM optical fiber 128 to the receiver unit 138, with all of the optical signals 116, 118, 120, 122 propagating along the same optical fiber 128. In this manner, the optical signal 116 may be detected at receiver unit 132 substantially free of optical signals 118, 120 and 122, the optical signal 118 may be detected at receiver unit 134 substantially free of optical signals 116, 120 and 122, the optical signal 120 may be detected at receiver unit 136 substantially free of optical signals 116, 118 and 122, and the optical signal 122 may be detected at receiver unit 138 substantially free of optical signals 116, 118 and 120.

Furthermore, in many optical communications systems there are optical signals propagating in both directions along an optical fiber. This possibility is indicated in FIG. 1, where the optical signals are designated with double-headed arrows. In such a case, the transmitter units and receiver units may be replaced by transceiver units that generate and receive signals that propagate along a particular mode of the concentric SDM fiber 128. In other embodiments, there may be a separate transmitter unit and receiver unit for a signal at each end of the optical fiber system 106.

In addition, a signal from a transmitter need not be restricted to only one wavelength. For example, one or more of the transmitter units 108, 110, 112 and 114 may produce respective wavelength division multiplexed signals 116, 118, 120, 122 that propagate along respective modes of the concentric SDM optical fiber 128. In such a case, the receiver units 132, 134, 136 and 138 may each be equipped with wavelength division demultiplexing units so that the optical signal at one specific wavelength can be detected independently from the optical signals at other wavelengths.

Figure 2A:
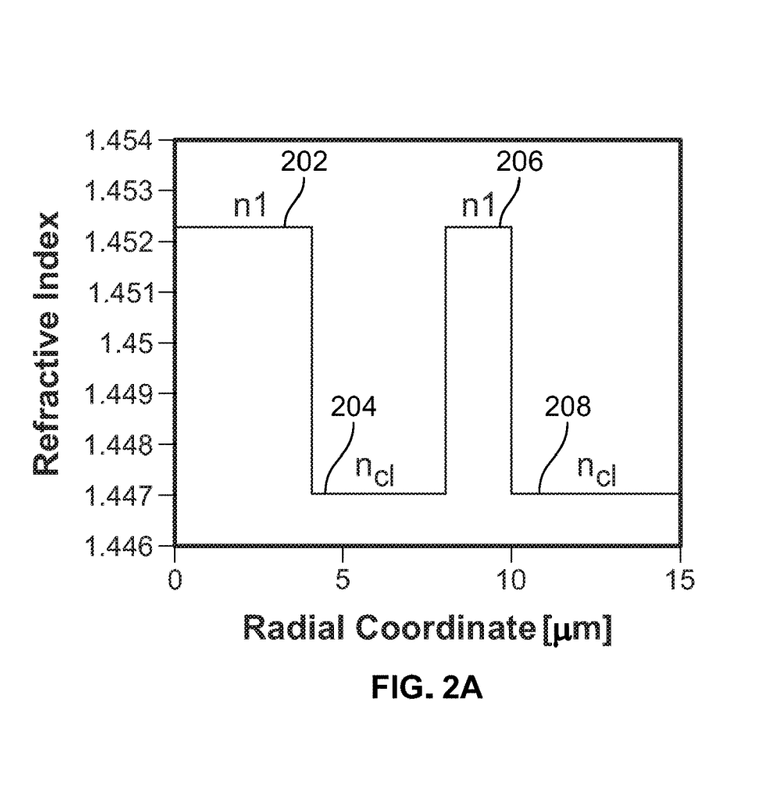
FIGS. 2A and 2B schematically illustrate an exemplary circularly symmetric, radial refractive index profile as used in an embodiment of the present invention.
Figure 2B:
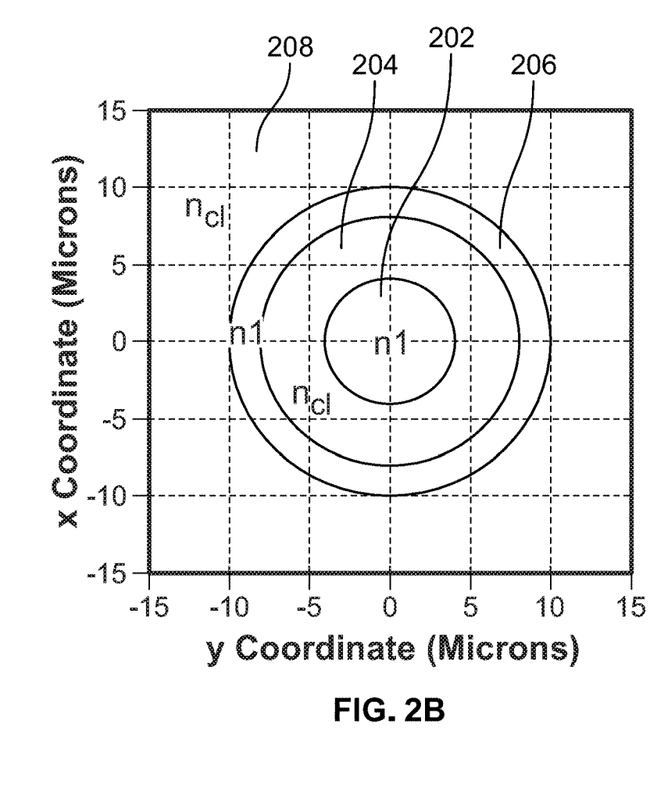

A concentric SDM fiber is an optical fiber that contains two or more concentric rings of material having a higher refractive index that the immediately surrounding material. The refractive index profile of one embodiment of a concentric SDM fiber is shown in FIGS. 2A and 2B. FIG. 2A shows the refractive index as a function of radial position from the center of the fiber, while FIG. 2B shows the refractive index of a cross-sectional profile of the fiber. In this embodiment, there is a central core 202 of material having a relatively high refractive index, n1. The central core 202 is surrounded by a first ring of low index material 204, having a relatively low refractive index, $r_{cl}$. The first ring of low index material 204 is surrounded by a first ring of relatively high index material 206 having a relatively high refractive index, n1. The first ring of relatively high index material 206 is surrounded by material having a relatively low index 208, with a refractive index of $n_{cl}$.

The concentric SDM fiber is not restricted to having only two concentric portions of high index material, nor is the refractive index of the high index portions of material restricted to being the same for each high index portion. For example, in the refractive index profiles for the embodiment of concentric SDM fiber shown in FIGS. 3A and 3B, there are three portions of relatively high refractive index material, a central core 302 and two concentric rings 306, 310, interspersed with portions of material having a relatively low refractive index 304, 308, 312. In this embodiment, the refractive index of the low index portions 304, 308, 312 is $n_{cl}$. The refractive index of the central core 302 is n1, the refractive index of the first high index ring 306 is n2, which is less than n1 but greater than $n_{cl}$, and the refractive index of the second high index ring 310 is n3, which is less than n2, but greater than n'1.

The concentric SDM fiber is not restricted to having only two or three concentric portions of high refractive index material, and may include four or more. Furthermore, the low refractive index portions need not all have the same refractive index. For example, in the refractive index profiles of concentric SDM fiber shown in FIGS. 4A and 4B, the central core 402 has a refractive index of n1 and the first high index ring 406 has a refractive index of n2, which is less than n1. The innermost low index region 404 has a refractive index of $n_{cl1}$ and the low index region 408 outside the first high index ring 406 has a refractive index of $n_{cl2}$, which need not be the same as $n_{cl1}$. In the illustrated embodiment, the value of $n_{cl2}$ is less than $n_{cl1}$, although in some embodiments it may be greater than $n_{cl1}$.

A concentric SDM fiber can be made using known processes for providing a desired refractive index profile in an optical fiber, including chemical vapor deposition techniques such modified chemical vapor deposition (MCVD) or plasma enhanced chemical vapor deposition (PCVD), or processes described in U.S. Pat. No. 6,062,046, incorporated herein by reference.

In the embodiment of concentric SDM fiber described in FIGS. 2A and 2B, the core region 202 has a refractive index of 1.452 and a radius of 4 μm, the first low index region has an index of 1.447 and is present in the radial region 4 μm, to 8 μm from the fiber center. The high index ring 206 has a refractive index the same as the core region 202 and is located between 8 μm and 10 μm from the fiber center. The outer low index region 208 has the same refractive index as the first low index region 204 and is located at a radial distance of more than 10 μm from the fiber center. Thus, the refractive index difference between the high and low index regions of this embodiment of fiber is 0.005.

Figure 3A:
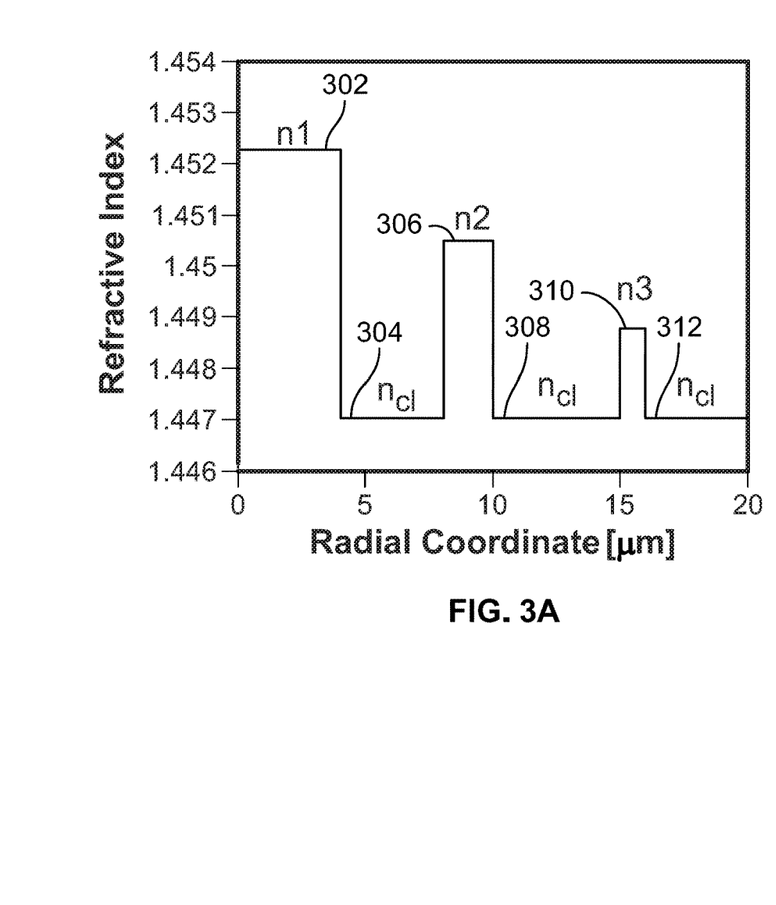
FIGS. 3A and 3B schematically illustrate another exemplary circularly symmetric, radial refractive index profile as used in another embodiment of the present invention.
Figure 3B:
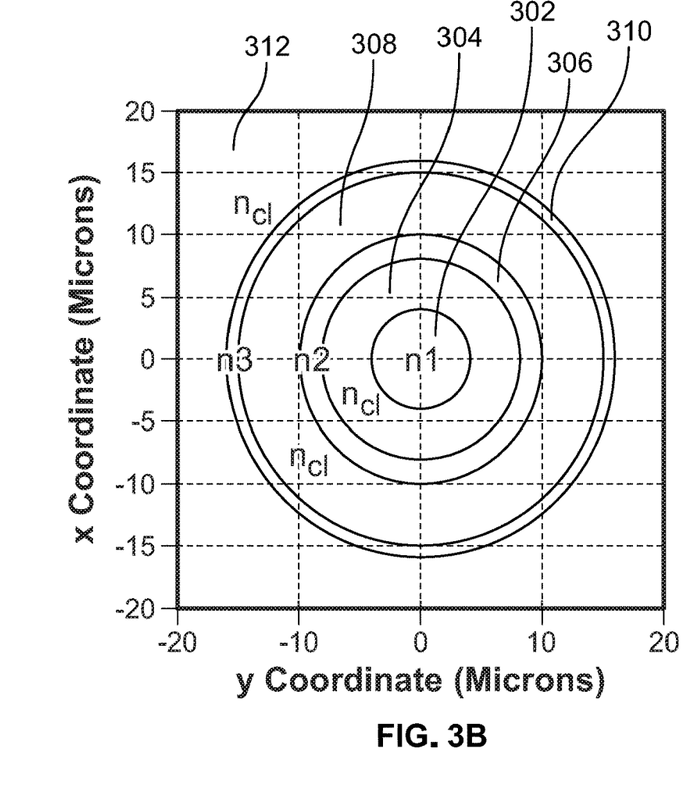

In the embodiment of concentric SDM fiber described in FIGS. 3A and 3B, the core region 302 has a refractive index of 1.452 and has a radius of 4 μm. The first low index ring 304 is located at a radius of between 4 μm and 8 μm and has a refractive index of 1.447. The first high index ring 306 has a refractive index of 1.451 and is located at a radius of between 8 μm and 10 μm. The second low index ring 308 has the same refractive index as the first low index ring 304 and is located at a radius of between 10 μm and 15 μm. The third high index ring 310 has a refractive index of 1.449 and is located between a radius of 15 μm and 16 μm. The third low index region 312 has the same refractive index as the first low index ring 304 and is located at a radial distance of more than 16 μm. Thus the refractive index difference between the high index core 302 and the first low index ring 304 is 0.005, while the refractive index difference between the first high index ring 306 and the low index material 304, 308 is 0.004, and the refractive index difference between the second high index ring 310 and the low index material 308, 312 is 0.002.

Figure 4A:
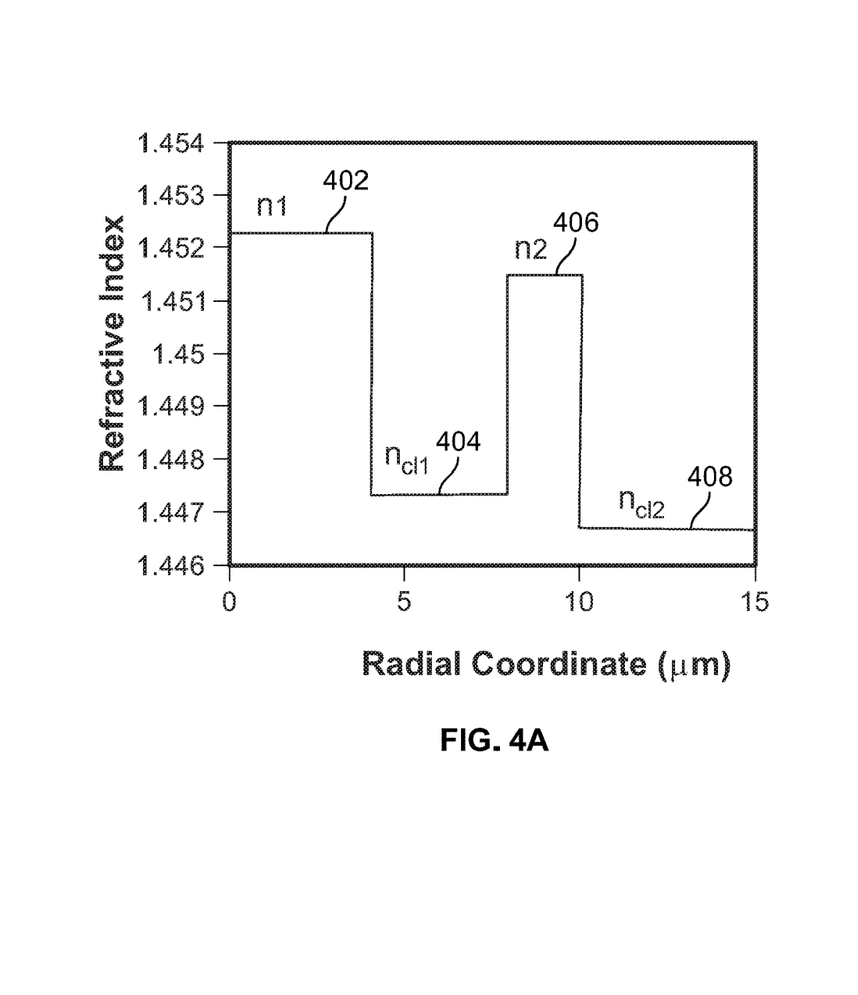
FIGS. 4A and 4B schematically illustrate another exemplary circularly symmetric, radial refractive index profile as used in another embodiment of the present invention.
Figure 4B:
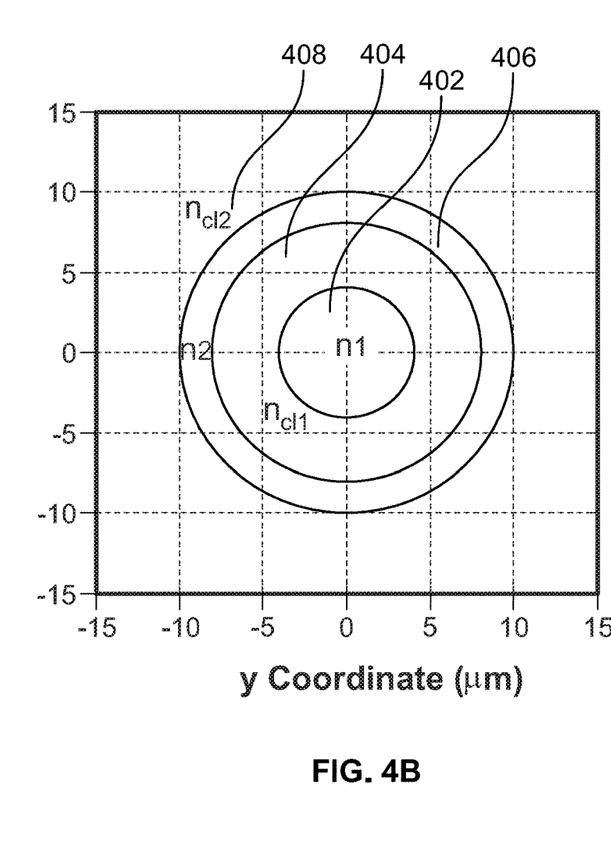

In the embodiment of the concentric SDM fiber described in FIGS. 4A and 4B, the core region 402 has a refractive index of 1.452 and a radius of 4 μm. The first low index ring 404 has a refractive index of 1.448 and is located at a radial distance of 4 μm to 8 μm. The first high index ring 406 has a refractive index of 1.451 and is located radially between 8 μm and 10 μm. The second low index region is located at a radial distance of more than 10 μm and has a refractive index of 1.447. Thus the refractive index between the high index core region 402 and the first low index ring 404 is 0.004 and the average refractive index difference between the first high index ring 406 and the surrounding low index regions 404, 408 is given by $n1-((n_{cl1}+n_{cl2})/2)=0.004$.

The invention is not restricted to the embodiments of concentric SDM optical fibers described in FIGS. 2A-2B, 3A-3B and 4A-4B, either to the values of refractive index for the various portions of the fiber, and the concomitant refractive index differences between adjacent fiber regions, nor to the specific radii of the various fiber regions. The values of refractive index used in the examples shown in FIGS. 2A, 2B, 3A, 3B, 4A and 4B are for light at a wavelength of 1550 nm, although it will be appreciated that other values of refractive index may be used for this wavelength or for other wavelengths. These values for the illustrated embodiments should be taken as illustrative only. Furthermore, in the illustrated embodiments there is a step change in the refractive index between adjacent fiber regions. This is not intended to be a limitation of the invention, and it is understood that the change in refractive index between regions may take place over a non-zero range of radius within an optical fiber. The step index changes shown in FIGS. 2A, 2B, 3A, 3B, 4A and 4B are intended for illustrative purposes only.

FIGS. 5A-5G illustrate results of numerical modeling of optical modes present in a fiber having two concentric high index regions, similar to that shown in FIGS. 2A and 2B. The figures use a different scale for the y-coordinate and the x-coordinate, and so may not appear to be circular in nature, even though the calculated mode patterns are circular.

The following parameters were assumed in the model used to produce the illustrated results.

| Parameter | Value |
| --- | --- |
| High index core ref. ind. | 1.452 |
| High index core outer radius (μm) | 4 |
| First low index ring ref. ind. | 1.447 |
| First low index ring inner radius (μm) | 4 |
| First low index ring outer radius (μm) | 8 |
| First high index ring ref. ind. | 1.451 |
| First high index ring inner radius (μm) | 8 |
| First high index ring outer radius (μm) | 10 |
| Second low index ring ref. ind. | 1.447 |
| Second low index ring inner radius (μm) | 10 |
| Second low index ring outer radius (μm) | 13 |
| Third high index ring ref. ind. | 1.451 |
| Third high index ring inner radius (μm) | 13 |
| Third high index ring outer radius (μm) | 15 |
| Light wavelength (nm) | 1310 |

Figure 5A:
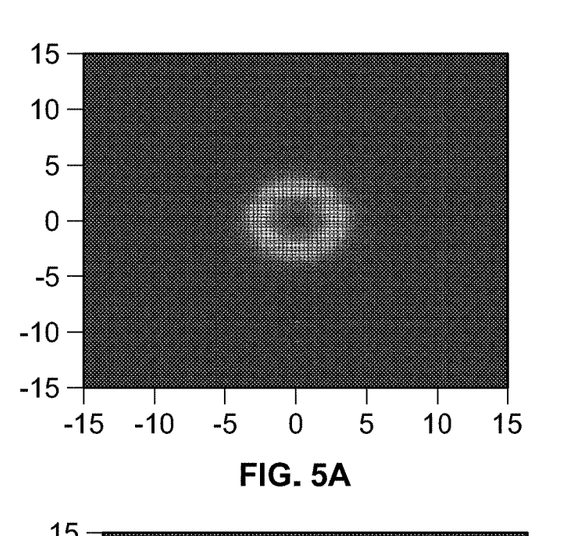
FIGS. 5A-5G illustrate the results of computations showing the modal optical power present in an SDM fiber having concentric cores according to an embodiment of the present invention.
Figure 5B:
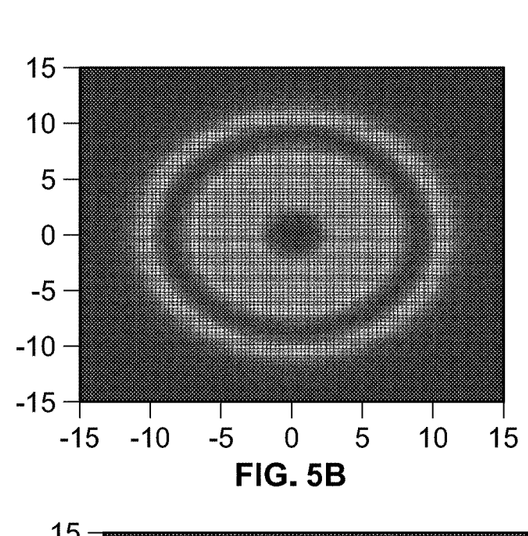

The modal electromagnetic fields associated with the fiber whose structure is described in the table above are strongly linearly polarized due to the relative small contrast in the index of refraction, and hence may be labeled in a fashion similar to the LP modes that arise in a typical multimode fiber having a single core and a cladding, and so reference is made to LP modes to describe the modes arising in the concentric SDM fiber. FIG. 5A shows the calculated power distribution in the fundamental mode, which propagates solely in the fiber core region, and may be called an $LP_{01}$ mode. FIG. 5B shows the calculated power distribution in a higher order mode that is circularly symmetric, and which carries power in both the inner core and the high index surrounding ring. This mode can be referred to as an $LP_{02}$ mode.

Figure 5C:
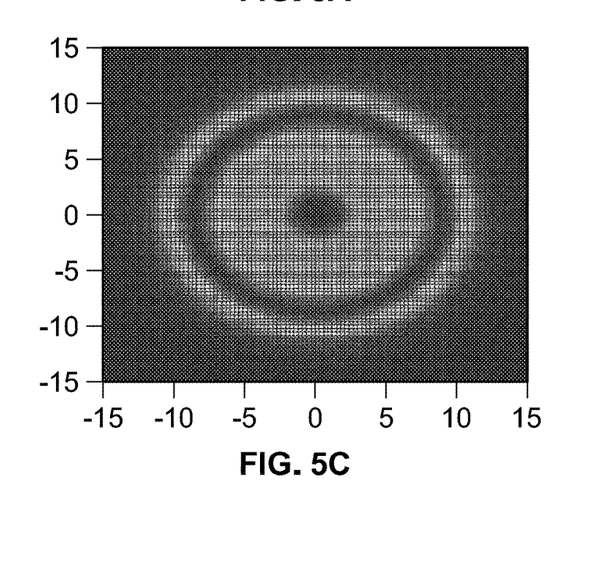
Figure 5D:
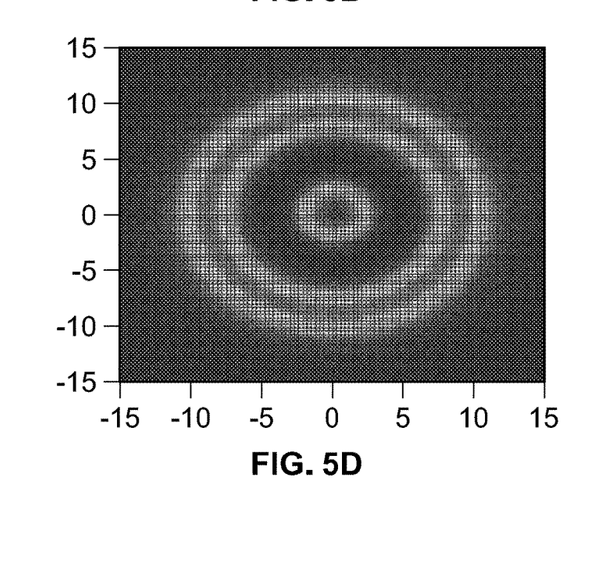

FIGS. 5C and 5D respectively show the power distributions of higher order modes that occupy both the inner core and first high index ring. These may be referred to as $LP_{12}$ modes.

Figure 5E:
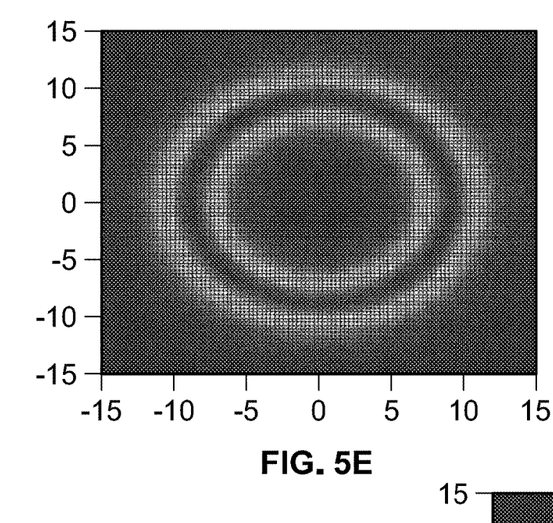
Figure 5F:
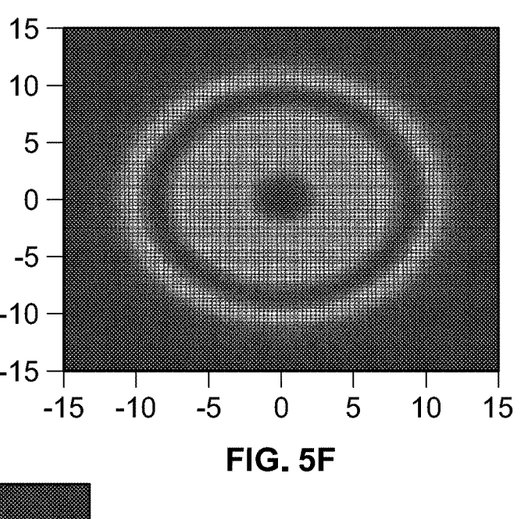
Figure 5G:
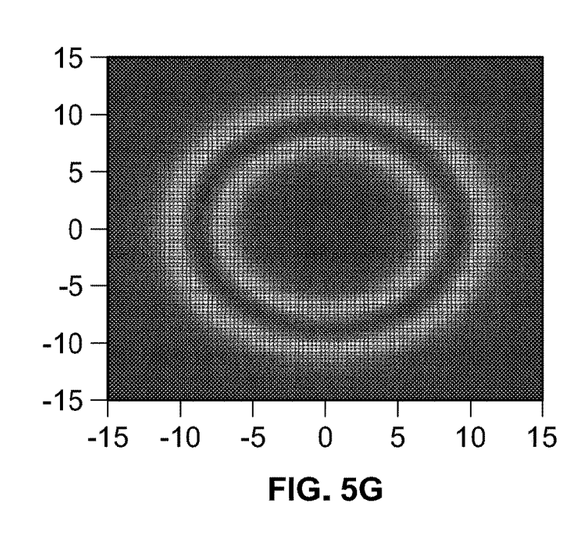

FIGS. 5E, 5F and 5G respectively show the power distributions of higher order modes that are contained solely within the first high index ring. These modes may be referred to as $LP_{21}$ modes.

Where the concentric rings are sufficiently far apart and/or the refractive index difference between the high index regions and the cladding is sufficiently high, each mode may be effectively confined to a single ring. This may be referred to as high confinement. For example, the optical power in each mode was calculated for the fiber having the following refractive index profile:

| | Range (μm from fiber center) | Refractive index |
| --- | --- | --- |
| central high index region | 0-4.06 | 1.4523 |
| second high index region | 10-12 | 1.4533 |
| third high index region | 20-21 | 1.4523 |
| cladding | | 1.4470 |

The cladding is the material between the regions of high refractive index, e.g. between 4.06 μm and 10 μm, 12 μm and 20 μm and beyond 21 μm.

Figure 6A:
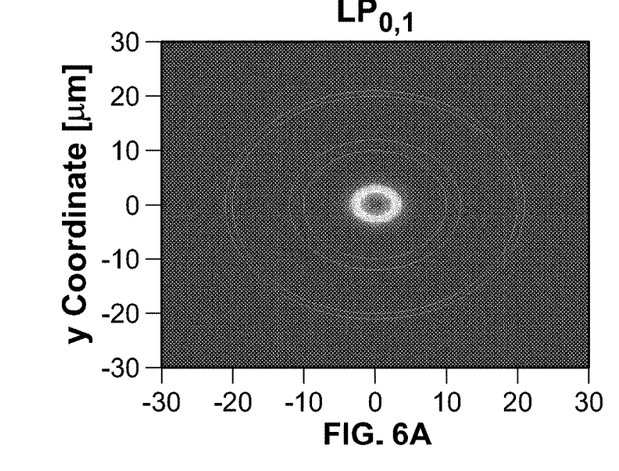
FIGS. 6A-6H illustrate results of computations showing the optical power in various modes in an exemplary high confinement SDM fiber having concentric cores according to an embodiment of the present invention.
Figure 6B:
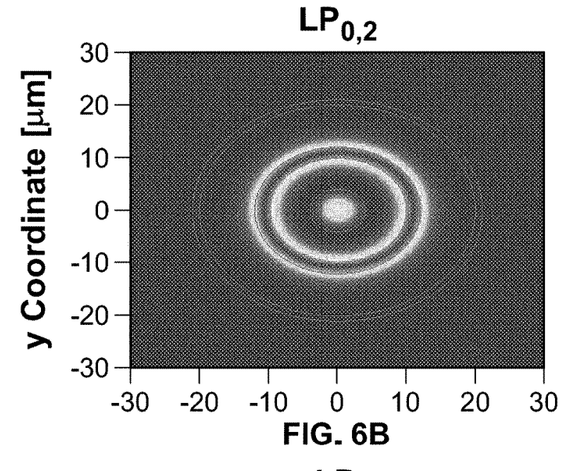
Figure 6C:
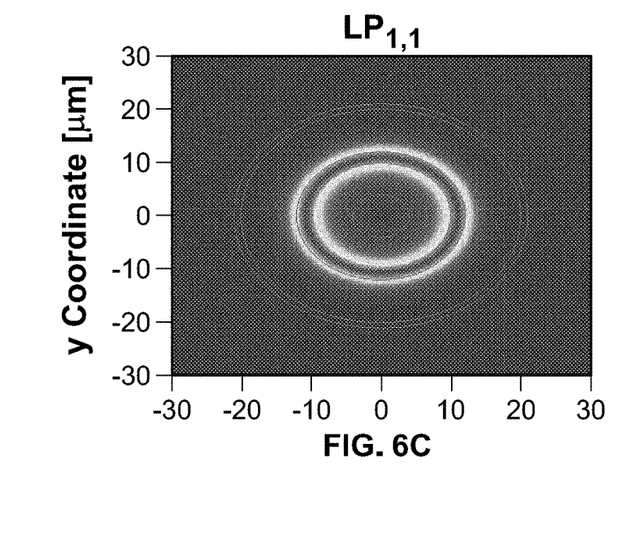
Figure 6D:
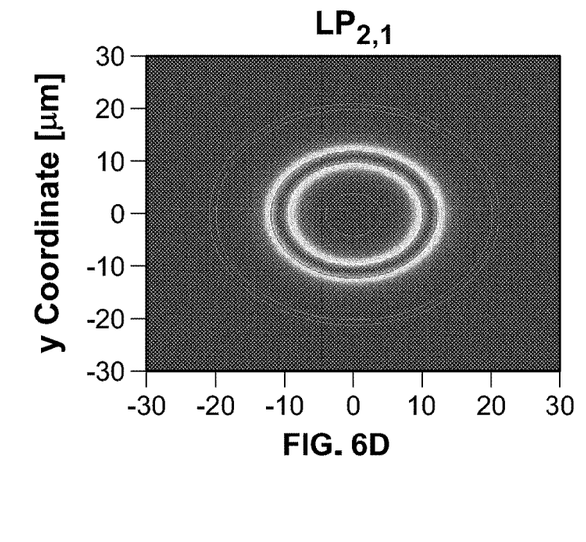
Figure 6E:
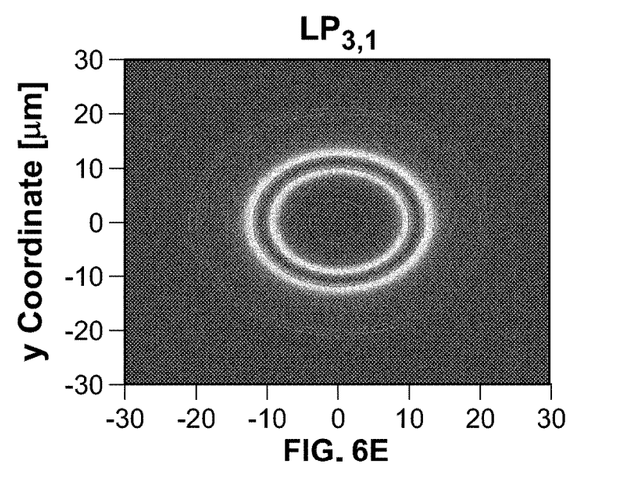
Figure 6F:
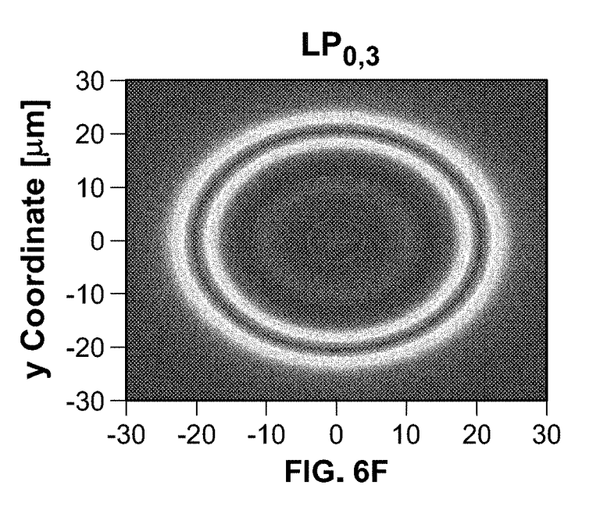
Figure 6G:
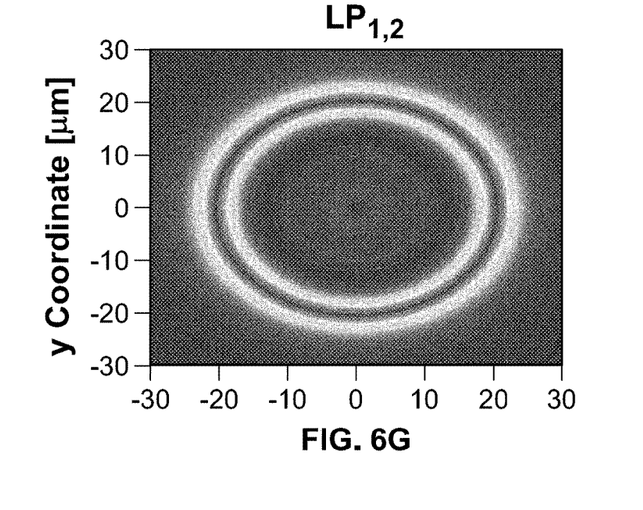
Figure 6H:
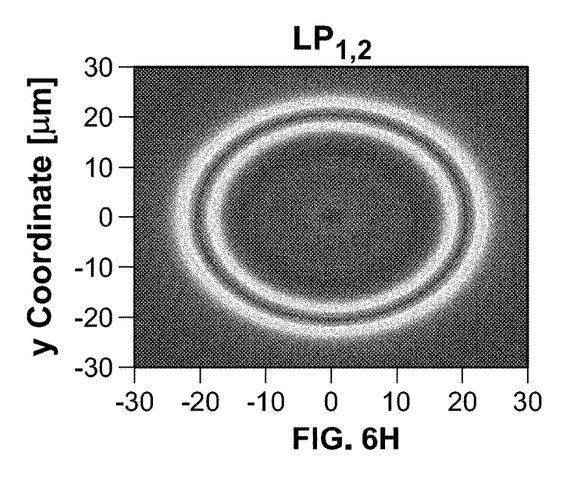

The power distribution in the fiber is shown for eight modes in FIGS. 6A-6H. In each case, the positions of the high index regions are delineated by red concentric lines. FIG. 6A shows that the fundamental $LP_{01}$ mode is confined almost entirely to the central high index region. The $LP_{02}$ mode is substantially confined to the second high index region, see FIG. 6B, with only a small amount of power in the central high index region. The $LP_{11}$, $LP_{21}$, and $LP_{31}$ modes are confined almost entirely to the second high index region, as seen in FIGS. 6C, 6D and 6E respectively. Likewise, the $LP_{03}$, $LP_{12}$ and $LP_{22}$ modes are almost entirely confined to the third high index region, as seen in FIGS. 6F, 6G and 6H. In some embodiments more than 90% of the power of each LP mode is confined to a single high index region, with less than 10% appearing in another high index region, and preferably less than 5% in another high index region and more preferably less than 1% in another high index region.

In other embodiments of the invention, where the regions of high index are closer together and/or the refractive index difference between high index regions and the classing is lower, a majority of the optical power carried by an LP mode can be found in one high index region, while there is a significant fraction of power carried in another high index region, or the optical power may be shared substantially over two or more high index regions. Furthermore, some of the optical power may be present in the cladding between the high index regions. This situation may be referred to as low confinement. For example, the optical power in each mode was calculated for the fiber having the following refractive index profile:

| | Range (μm from fiber center) | Refractive index |
| --- | --- | --- |
| central high index region | 0-4.06 | 1.4523 |
| second high index region | 8.06-10 | 1.4538 |

| | Range (μm from fiber center) | Refractive index |
|---|---|---|
| third high index region | 13-15 | 1.4528 |
| | Cladding | 1.4470 |

Figure 7A:
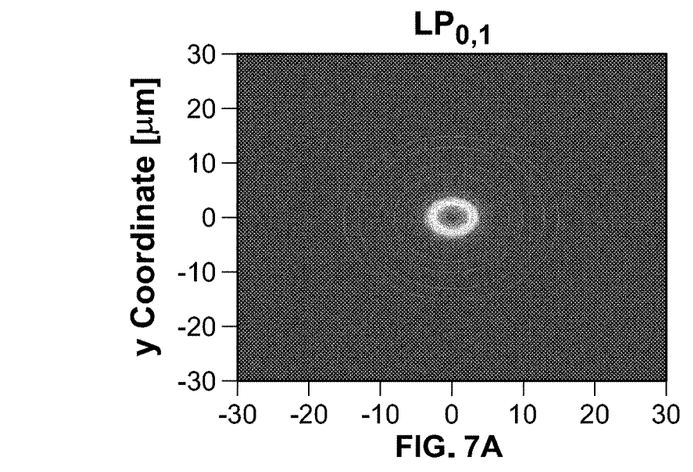
FIGS. 7A-7H illustrate results of computations showing the optical power in various modes in an exemplary low confinement SDM fiber having concentric cores according to an embodiment of the present invention.
Figure 7B:
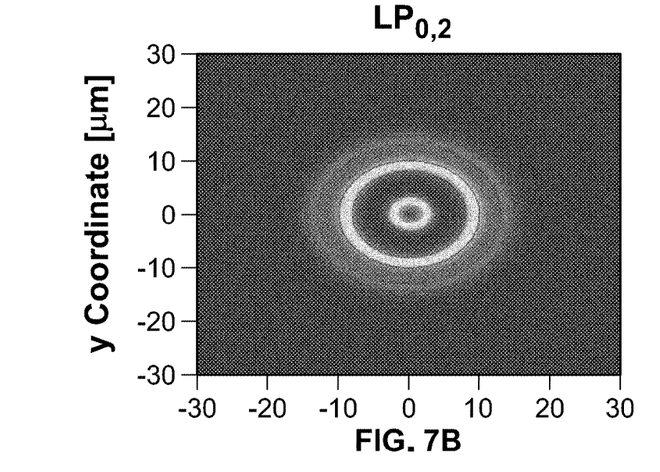
Figure 7C:
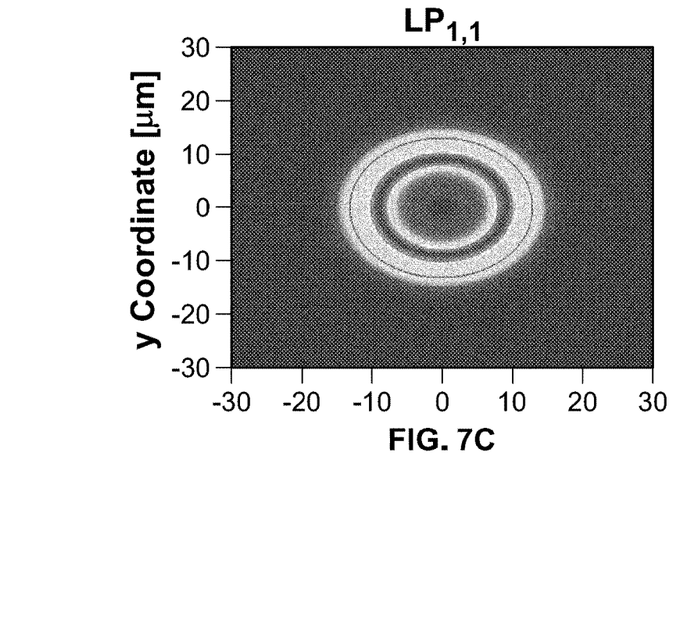
Figure 7D:
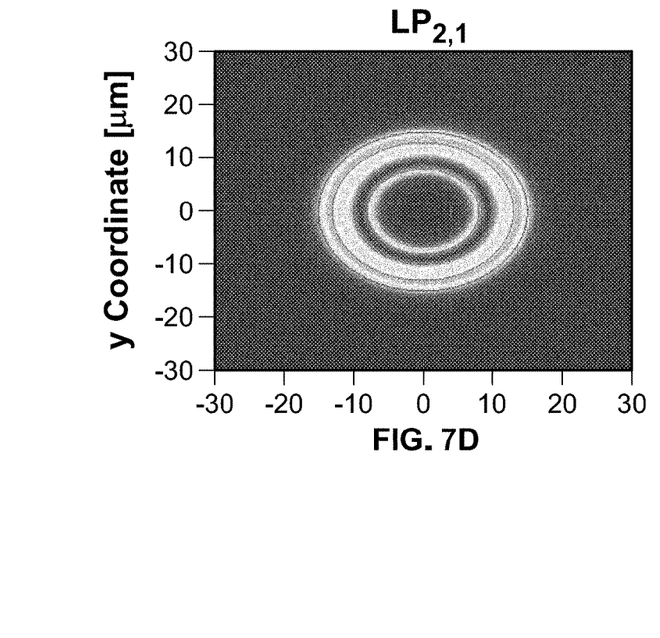
Figure 7E:
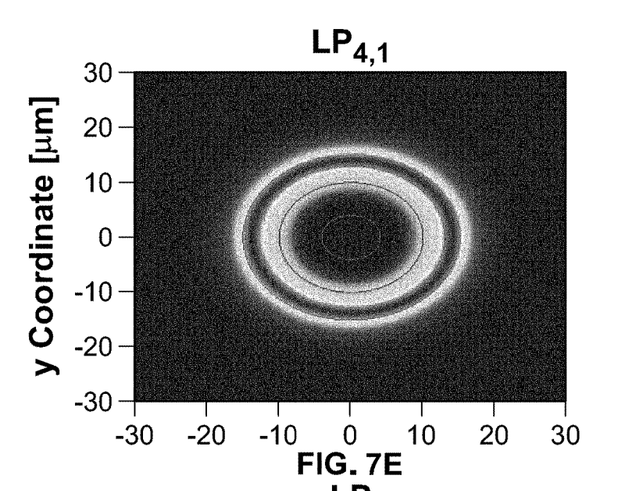
Figure 7F:
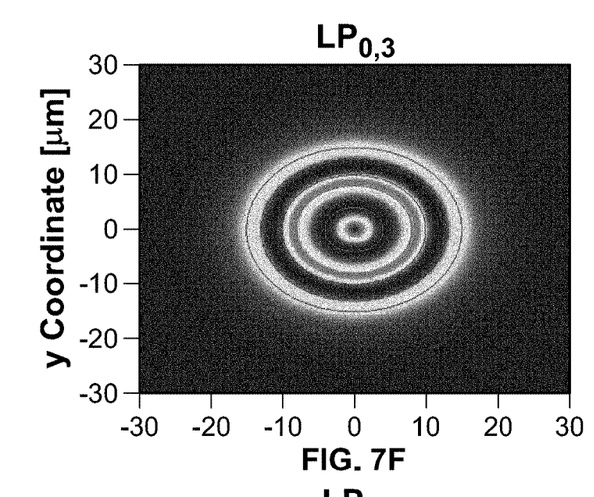
Figure 7G:
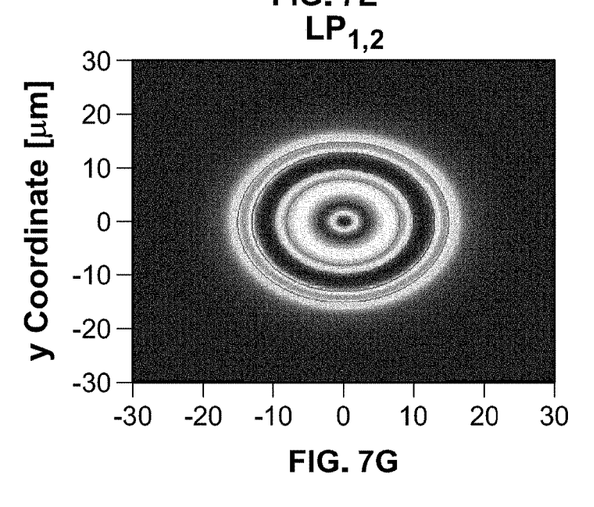
Figure 7H:
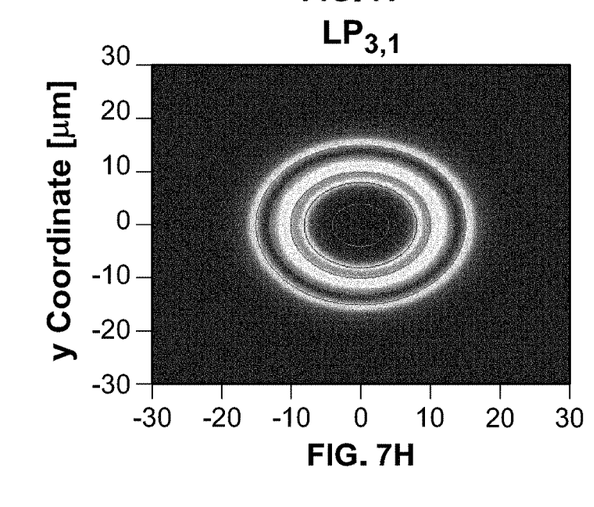

The power distribution in the fiber is shown for eight modes in FIGS. 7A-7H. FIG. 7A shows that the fundamental $LP_{01}$ mode is confined almost entirely to the central high index region. The $LP_{02}$ mode includes power primarily in the central high index region and in second high index region, see FIG. 7B. The $LP_{11}$ mode includes power primarily in the second high index region, with some also in the third high index region, see FIG. 7C. The $LP_{21}$ mode includes optical power primarily in the second high index region and some also in the third high index region, see FIG. 7D. The $LP_{41}$ mode has the majority of its optical power in the third high index region, with some power extending inwards to the second high index region, see FIG. 7E. The $LP_{03}$ and $LP_{12}$ modes include optical power in the central high index region, the second high index region and the third high index region, see FIGS. 7F and 7G. The optical power of the $LP_{31}$ mode is primarily in the third high index region and, to a lesser extent in the second high index region, but is absent from the central high index region.

The different modes in the concentric SDM fiber have respective group velocities, which can be calculated using conventional approaches. Group velocity dispersion may provide limitations to the bandwidth-distance product of a particular fiber. However, the size and refractive index of the various concentric rings may be tuned to minimize group velocity dispersion, as well as to keep the modal fields bound to the fiber. For example, the high index core may be limited in radial extent so that it supports only the $LP_{01}$ mode, or the first high index ring may be made sufficiently narrow radially that only one radial mode is supported. Thus, limiting the number of radial modes carried by the high index core or ring reduces bandwidth limitations due to dispersion.

Furthermore, group velocities of mode groups may be made to be somewhat similar so that light propagating within a mode group is dispersed less than light propagating in different mode groups. Exemplary mode group velocities for $LP_{ln}$ modes, where l is the angular index and n is the radial index, are shown below for a fiber with the characteristics of the low-confined example provided above:

| l | n | Group velocity ($10^8$ m s$^{-1}$) |
|---|---|---|
| 0 | 1 | 2.06450445089241 |
| 0 | 2 | 2.06466904574457 |
| 0 | 3 | 2.06393351529015 |
| 1 | 1 | 2.06590901339276 |
| 1 | 2 | 2.06490135791618 |
| 2 | 1 | 2.06546843408278 |
| 2 | 2 | 2.06433573452656 |
| 3 | 1 | 2.06505406068231 |
| 4 | 1 | 2.06463064549477 |

It is particularly desirable that values of group velocity, $v_g$, are close together for different modes that propagate along a single ring, so as to reduce modal group velocity dispersion. This might be achieved, for example, by engineering the fiber so that high index rings farther from the fiber center have decreasing or increasing refractive index values, in a manner like that shown in FIG. 3A or FIG. 8A. It is also preferred that values of $v_g$ in different rings are relatively close together so that signals launched into the fiber at the same time are detected at around the same time.

Another consideration in designing a concentric core fiber is the width of the concentric ring. If the ring is narrower and/or the refractive index difference with the cladding is lower, then the modes will become increasingly poorly confined to the ring. On the other hand, if the ring is too wide, then the ring may support more modes, which may lead to bandwidth limitations due to intermodal dispersion.

Figure 8A:
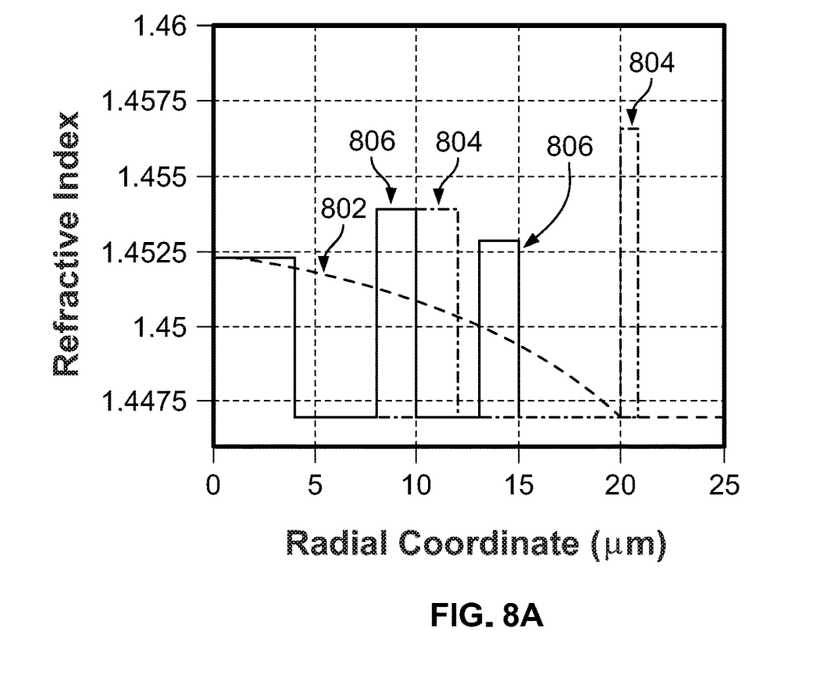
FIG. 8A shows three exemplary refractive index profiles for i) a few-mode fiber, ii) a high confinement SDM fiber having concentric cores according to an embodiment of the present invention and iii) a low confinement SDM fiber having concentric cores according to another embodiment of the present invention.

A comparison of the group and phase velocities of and FMF with fibers of the present invention is discussed with reference to FIGS. 8A and 8B. FIG. 8A schematically shows three different fiber refractive index profiles, as a function of radial distance from the center of the fiber. The smooth curve 802 represents a parabolic profile as might be found in an FMF. The stepped profile shown with a dashed line represents the refractive index profile of the high confinement fiber discussed above with reference to FIGS. 6A-6H, while the stepped profile shown with a continuous line 806 represents the refractive index profile of the low confinement fiber discussed above with reference to FIGS. 7A-7H. The refractive index profile 802 of the FMF was selected so that it supported about as many modes as the exemplary concentric ring fibers with profiles 804 and 806.

Figure 8B:
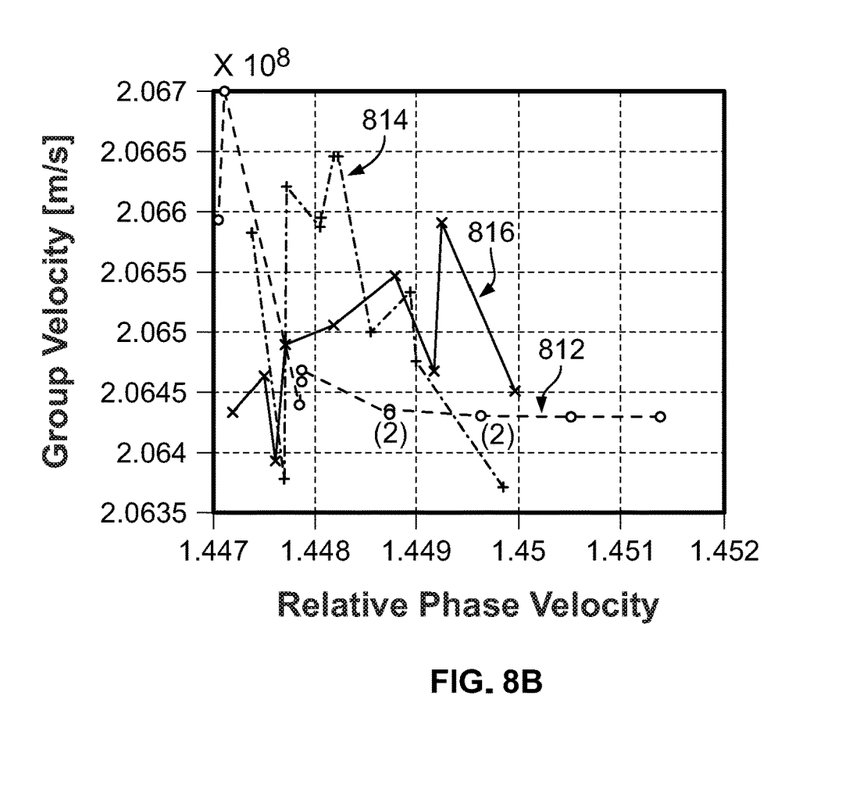
FIG. 8B shows calculated group and relative phase velocities for modes of the fibers having the refractive index profiles shown in FIG. 8A.

FIG. 8B shows a plot of group velocity against phase velocity for the modes of each of the three exemplary fibers. Line 812 shows the phase and group velocity pairs for the modes of the FMF, whose refractive index profile is curve 802 in FIG. 8A. The parenthetical "(2)" beside two of the dots on this line indicate that there are two modes whose group and phase velocities almost overlap. Line 814 shows the phase and group velocity pairs for the modes of the high confinement concentric fiber, whose refractive index profile is curve 804 in FIG. 8A. Line 816 shows the phase and group velocity pairs for the modes of the low confinement concentric fiber, whose refractive index profile is curve 806 in FIG. 8A.

Several modes of the FMF, line 812, are equidistant in phase velocity, particularly at relative phase velocity values above about 1.4475. Furthermore, the relatively flat portion of line 812 at relative phase velocity values higher than about 1.4485 is indicative of low group velocity dispersion resulting from the parabolic nature of the FMF refractive index profile. For the exemplary concentric fibers, lines 814 and 816, the modes have more disparate values of group and phase velocity, so the modes are more isolated. This is expected to lead to improved bending performance with less mode mixing, compared to the FMF.

Various suitable types of spatial multiplexer/demultiplexers may be used to launch the light signals into their respective high index core or ring. One approach is to use a photonic lantern, a low-loss optical waveguide device that connects a multimode fiber to several fiber cores that support fewer, typically single, modes. Such devices, described in greater detail in, e.g., Birks T A et al., "The Photonic Lantern," Advances in Optics and Photonics, 7 107-167 (2015) ("the Birks article"), have been developed for use with few-mode fibers. They are also suitable for use with the concentric SDM fiber, since the concentric SDM fiber carries optical modes that are somewhat analogous to the modes supported by a few-mode fiber, but with improved isolation between radial modes due to the concentric ring structure of the concentric SDM fiber.

Figure 9:
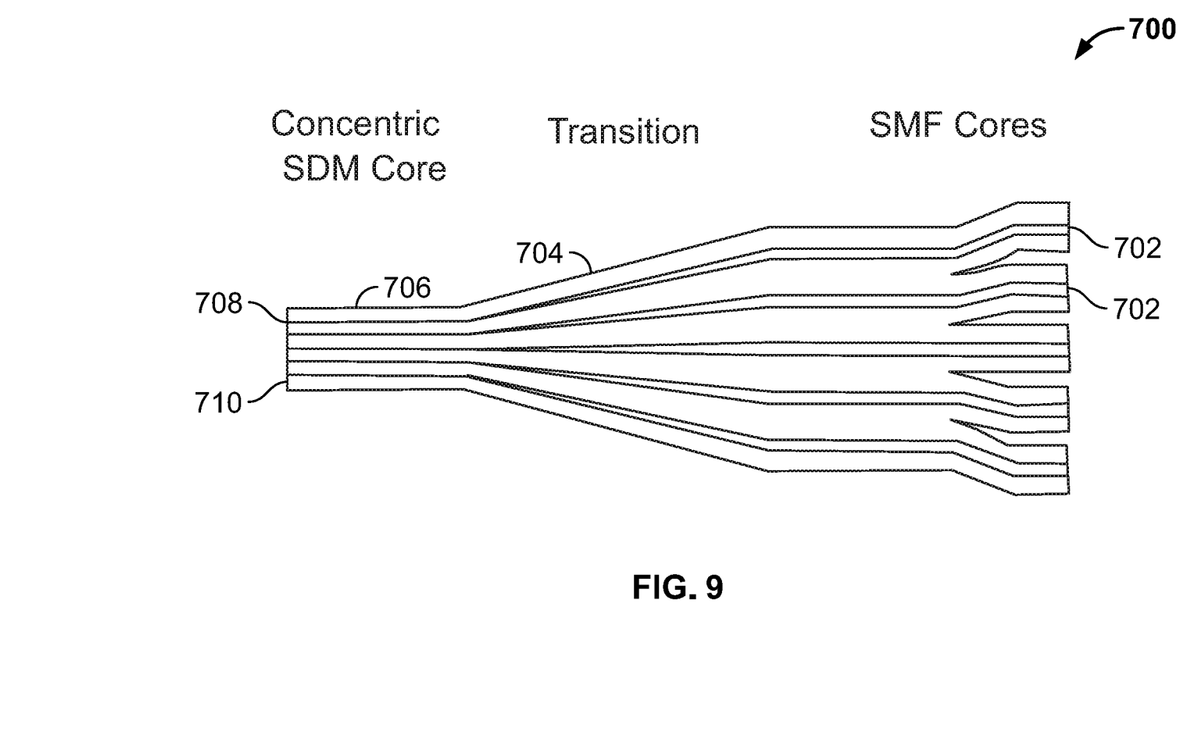
FIG. 9 schematically illustrates an embodiment of an optical lantern useful for multiplexing/demultiplexing optical signals into and out of a concentric SDM fiber according to the present invention.

An exemplary embodiment of a photonic lantern 700 is schematically illustrated in FIG. 9. The photonic lantern 700 includes a number of single mode fiber (SMF) cores 702 that are tapered in a tapered transition region 704 to an SDM core region 706. The positions of the tapered cores 708 at the output end 710 of the SDM core region 706 match the positions of the high index core and ring regions at the end of the concentric SDM fiber, so that light is efficiently transferred between the high index regions of the concentric SDM fiber and the tapered cores. A number of methods of manufacturing a photonic lantern are described in the Birks article, which is incorporated herein by reference.

Various modifications, equivalent processes, as well as numerous structures to which the present invention may be applicable will be readily apparent to those of skill in the art to which the present invention is directed upon review of the present specification. For example, although the examples provided herein describe optical fibers having refractive index profiles that are circularly symmetric, the invention also covers fibers whose refractive index profiles are elliptically symmetric, and which may be used for multimode transmission of light along polarization-preserved channels in the fiber. The claims are intended to cover such modifications and devices.

As noted above, the present invention is applicable to fiber optical communication and data transmission systems. Accordingly, the present invention should not be considered limited to the particular examples described above, but rather should be understood to cover all aspects of the invention as fairly set out in the attached claims.

What we claim as the invention is:

1. An optical communications system, comprising:
   a first transmitter unit to generate a first optical information data signal;
   a second transmitter unit to generate a second optical information data signal;
   an optical fiber comprising:
      a relatively high refractive index optical core region formed of material having a first refractive index;
      a first low index region surrounding the optical core region and formed from a material having a second refractive index lower than the first refractive index;
      a first high index ring region surrounding the first low index region and formed of a material having a third refractive index higher than the second refractive index; and
      a second low index region surrounding the first high index ring region and formed from a material having a fourth refractive index lower than the third refractive index;
   wherein the optical core region supports propagation of light along at least a first radial mode associated with the optical core region and the first high index ring region supports propagation of light along at least a second radial mode associated with the first high index ring region, the second radial mode being different from the first radial mode;
   a first receiver unit; and
   a second receiver unit;
   wherein the first optical information data signal from the first transmitter unit is transmitted through the relatively high refractive index core region of the optical fiber to the first receiver unit and the second optical information data signal from the second transmitter unit is transmitted through the first high index ring region to the second receiver unit.

2. The optical system as recited in claim 1, wherein the first refractive index is substantially equal to the third refractive index.

3. The optical system as recited in claim 1, wherein the first refractive index is greater than the third refractive index.

4. The optical system as recited in claim 1, wherein the second refractive index is substantially equal to the fourth refractive index.

5. The optical system as recited in claim 1, wherein the second refractive index is greater than the fourth refractive index.

6. The optical system as recited in claim 1, wherein the second refractive index is less than the fourth refractive index.

7. The optical system as recited in claim 1, further comprising a second high index ring region surrounding the second low index region and formed of a material having a fifth refractive index; and a third low index region surrounding the second high index ring region and formed from a material having a sixth refractive index lower than the fifth refractive index.

8. The optical system as recited in claim 7, wherein the fifth refractive index is substantially equal to the first refractive index.

9. The optical system as recited in claim 7, wherein the fifth refractive index is less than the third refractive index and greater than each of the second refractive index and the fourth refractive index.

10. The optical communications system of claim 1, further comprising a space division multiplexer, the first optical information signal passing into the relatively high refractive index core region of the optical fiber via the space division multiplexer, and the second optical information signal passing into the first high index ring region of the optical fiber via the space division multiplexer.

11. The optical communications system of claim 10, further comprising a space division demultiplexer, the first optical information signal passing from the relatively high refractive index core region of the optical fiber to the first receiver unit via the space division demultiplexer, and the second optical information signal passing from the first high index ring region of the optical fiber to the second receiver unit via the space division demultiplexer.

12. The optical communications system of claim 1, wherein the first transmitter unit is part of a first transceiver, the second transmitter unit is part of a second transceiver, the first receiver unit is part of a third transceiver and the second receiver is part of the fourth transceiver.

* * * * *